United States Patent [19]
Bollwahn et al.

[11] Patent Number: 6,058,969
[45] Date of Patent: May 9, 2000

[54] VENT SYSTEM FOR AN AUTOMATIC TRANSMISSION

[75] Inventors: Bryce Arnold Bollwahn, Fenton; David William Adamczyk, Canton; John D. Wagner, Commerce Township; Ronald James Putala, Plymouth, all of Mich.

[73] Assignee: Ford Global Technologies, Inc., Dearborn, Mich.

[21] Appl. No.: 09/222,161

[22] Filed: Dec. 29, 1998

[51] Int. Cl.⁷ ...................................... F16H 57/02
[52] U.S. Cl. .......................... 137/583; 74/606 R
[58] Field of Search ............ 137/583; 74/606 R

[56] References Cited

U.S. PATENT DOCUMENTS

| | | |
|---|---|---|
| 3,686,973 | 8/1972 | Davison, Jr. et al. . |
| 3,916,724 | 11/1975 | Muller et al. . |
| 4,331,185 | 5/1982 | Rinaldo et al. ............. 74/606 R X |
| 4,351,203 | 9/1982 | Fukunaga . |
| 4,506,562 | 3/1985 | Yamaura et al. ............. 74/606 R |
| 4,554,844 | 11/1985 | Hamano . |
| 4,911,035 | 3/1990 | Taguchi . |
| 4,970,913 | 11/1990 | Kielar et al. ............. 74/606 R |
| 5,024,345 | 6/1991 | Deweerdt ............. 74/606 R X |
| 5,062,447 | 11/1991 | Davison, Jr. et al. . |
| 5,127,287 | 7/1992 | Taniguchi et al. . |
| 5,129,422 | 7/1992 | Davison, Jr. et al. . |
| 5,220,854 | 6/1993 | Allart et al. ............. 74/606 R |
| 5,245,891 | 9/1993 | Marich et al. ............. 74/606 R |
| 5,509,949 | 4/1996 | Gluys et al. . |
| 5,515,747 | 5/1996 | Okada et al. . |
| 5,724,864 | 3/1998 | Rodgers et al. ............. 74/606 R |

FOREIGN PATENT DOCUMENTS

| | | |
|---|---|---|
| 0134560 | 3/1979 | Germany . |
| 0136064 | 6/1979 | Germany . |
| 5209671 | 8/1993 | Japan . |

*Primary Examiner*—John Rivell
*Attorney, Agent, or Firm*—Frank G. McKenzie

[57] ABSTRACT

A vent system for an automatic transmission includes a front body assembly connected to a housing of the automatic transmission and a connecting tube having a first end and a second end, the first end being connected to the front body assembly. The vent system also includes a rear body assembly connected to the housing and to the second end. The vent system allows ingress and egress of air between inside and outside of the automatic transmission and prevents ingress of moisture/water and egress of transmission fluid.

20 Claims, 3 Drawing Sheets

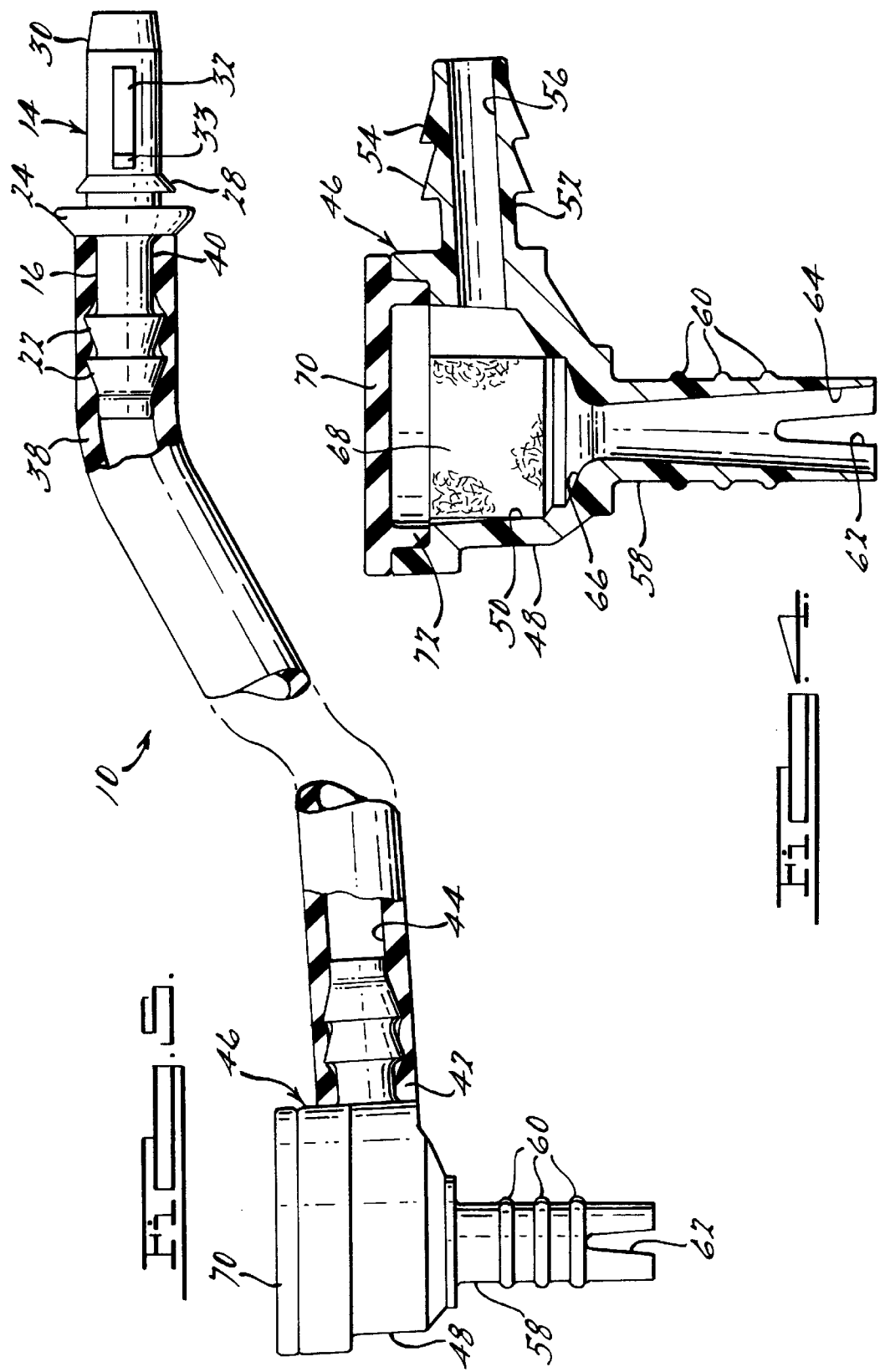

VENT SYSTEM FOR AN AUTOMATIC TRANSMISSION

BACKGROUND OF THE INVENTION

1. Field of the Invention

The present invention relates generally to transmissions for motor vehicles and, more particularly, to a vent system for an automatic transmission of a motor vehicle.

2. Description of the Related Art

It is known to provide a vent for an automatic transmission of a motor vehicle. For example, the vent may be of a common "Jiggle Cap" type in which a metal plate is used to cover an opening of a tube communicating with the interior of the automatic transmission. The metal plate is crimped over the tube to allow air to egress from the transmission and to prevent water from ingress to the automatic transmission.

Although the Jiggle Cap has worked well, it suffers from the disadvantage that moisture may be ingested into the automatic transmission. Another disadvantage of the Jiggle Cap is that transmission fluid may egress from the automatic transmission. Therefore, there is a need in the art to provide a vent system for an automatic transmission that allows for ingress and egress of air, but prevents ingress of water/moisture and the egress of transmission fluid.

SUMMARY OF THE INVENTION

Accordingly, the present invention is a vent system for an automatic transmission. The vent system includes a front body assembly connected to a housing of the automatic transmission and a connecting tube having a first end and a second end, the first end being connected to the front body assembly. The vent system also includes a rear body assembly connected to the housing and to the second end of the connecting tube. The vent system allows ingress and egress of air between inside and outside of the automatic transmission and prevents ingress of moisture/water and egress of transmission fluid.

One advantage of the present invention is that a vent system is provided for an automatic transmission of a motor vehicle that eliminates transmission fluid egress and eliminates the possibility of water ingress into the automatic transmission. Another advantage of the present invention is that the vent system incorporates a filter having a transmission fluid separator and baffles, a connecting tube that may act as a fluid reservoir and a front body assembly for connection into a sealed area of a bell housing for the automatic transmission.

Other features and advantages of the present invention will be readily appreciated as the same becomes better understood after reading the subsequent description taken in conjunction with the accompanying drawings.

BRIEF DESCRIPTION OF THE DRAWINGS

FIG. 4 is a sectional view taken along line 4—4 of FIG. 3.

FIG. 5 is a fragmentary elevational view of the vent system of FIG. 1.

DESCRIPTION OF THE PREFERRED EMBODIMENT(S)

Figure 1:
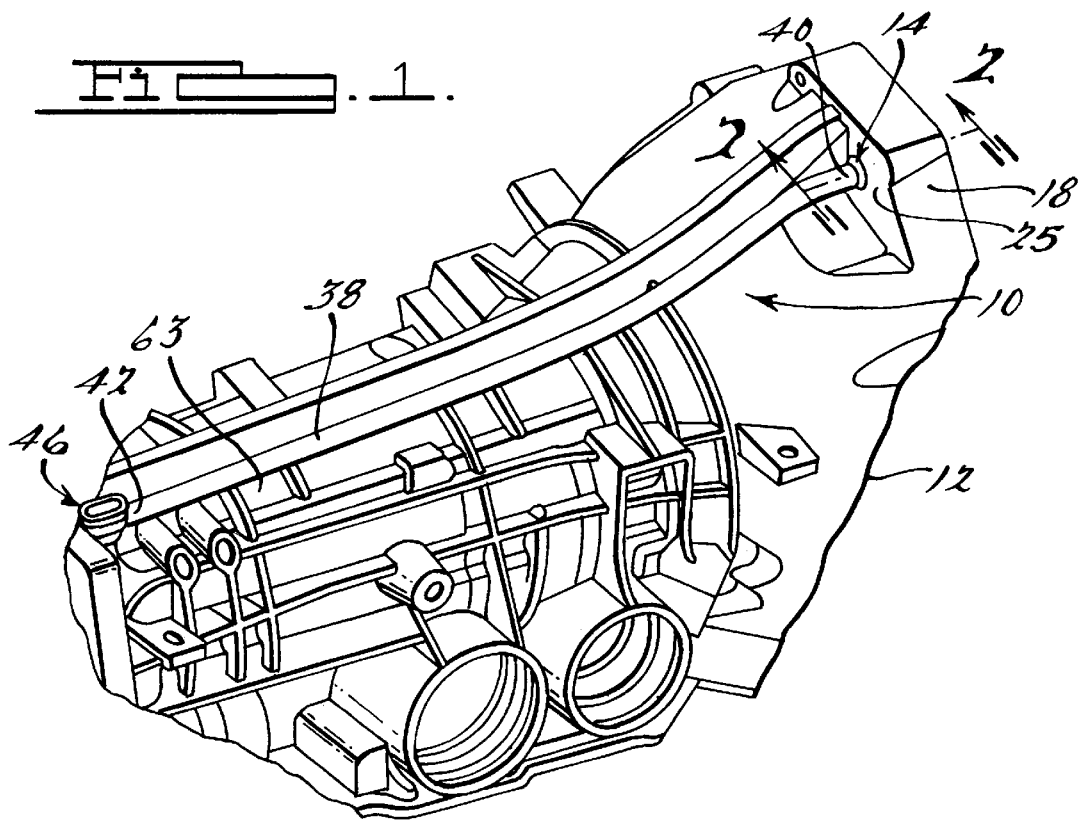
FIG. 1 is a perspective view of a vent system, according to the present invention, illustrated in operational relationship with an automatic transmission.

Referring to the drawings and in particular FIGS. 1 and 5, one embodiment of a vent system 10, according to the present invention, is illustrated in operational relationship with an automatic transmission 12. The vent system 10 allows ingress and egress of air between the inside of the automatic transmission 12 and the outside of the automatic transmission 12. It should be appreciated that, except for the vent system 10, the automatic transmission 12 is conventional and known in the art.

Figure 2:
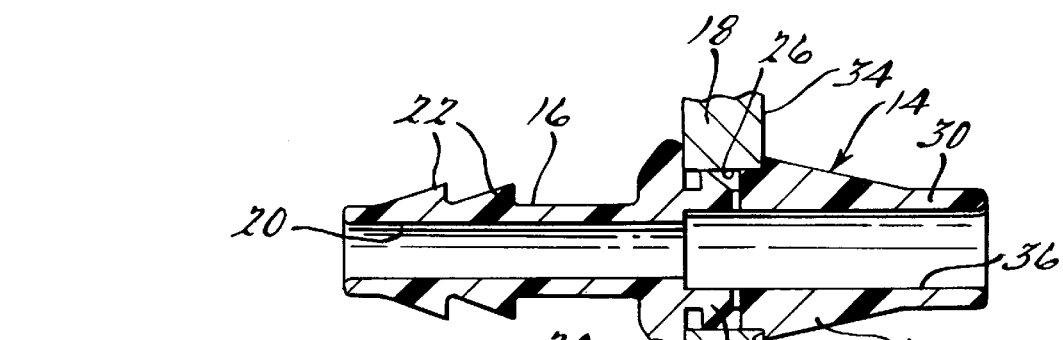
FIG. 2 is a sectional view taken along line 2—2 of FIG. 1.

Referring to FIGS. 1, 2 and 5, the vent system 10 includes a front body assembly, generally indicated at 14.

The front body assembly 14 includes a front body 16 connected to a bell housing 18 of the automatic transmission 12. The front body 16 is generally cylindrical in shape and has a passage 20 extending axially therethrough. The front body 16 includes at least one, preferably a plurality of barbs 22 extending outwardly near one end thereof. The barbs 22 are annular and Christmas tree shaped for a function to be described.

The front body 16 also includes a shoulder 24 extending radially outwardly and spaced axially from the barbs 22. The shoulder 24 is adapted to abut or engage an outer surface 25 of the bell housing 18. The front body 16 extends through an aperture 26 in the bell housing 18. The front body 16 includes a middle barb 28 extending outwardly to engage a wall forming the aperture 26. The middle barb 24 is angular and Christmas tree shaped.

Figure 6:
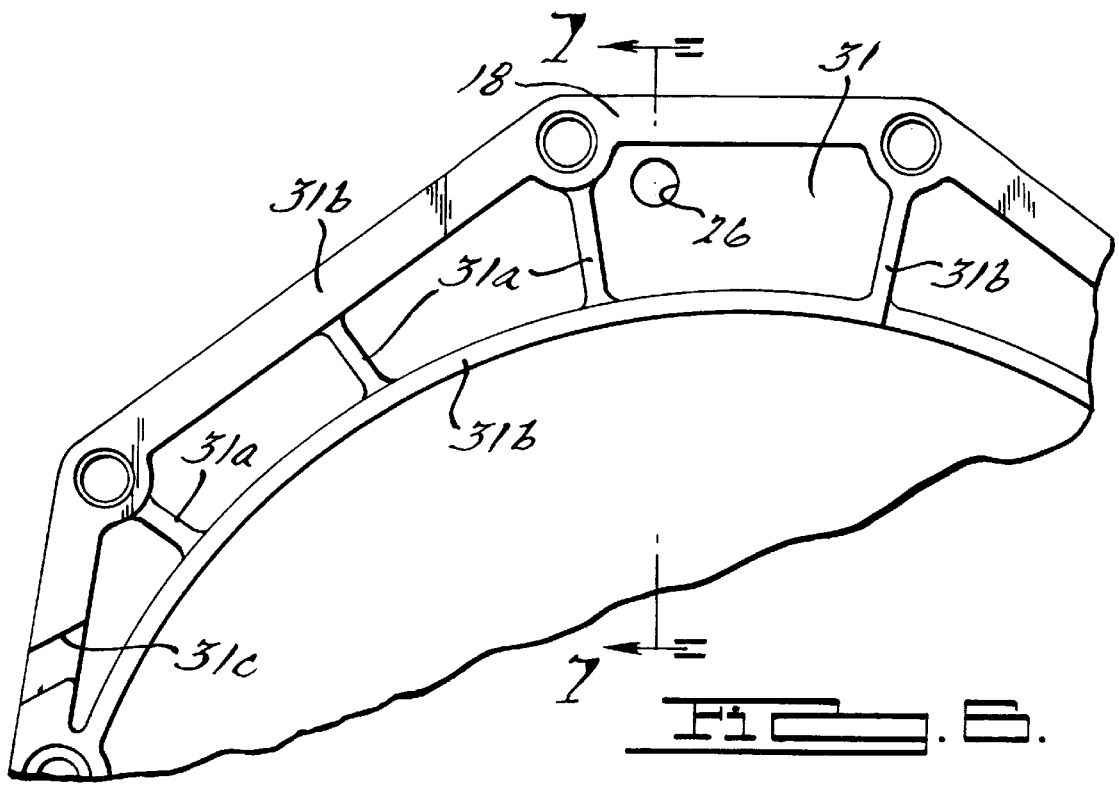
FIG. 6 is an enlarged partial elevational view of a portion of the bell housing of the automatic transmission of FIG. 1.
Figure 7:
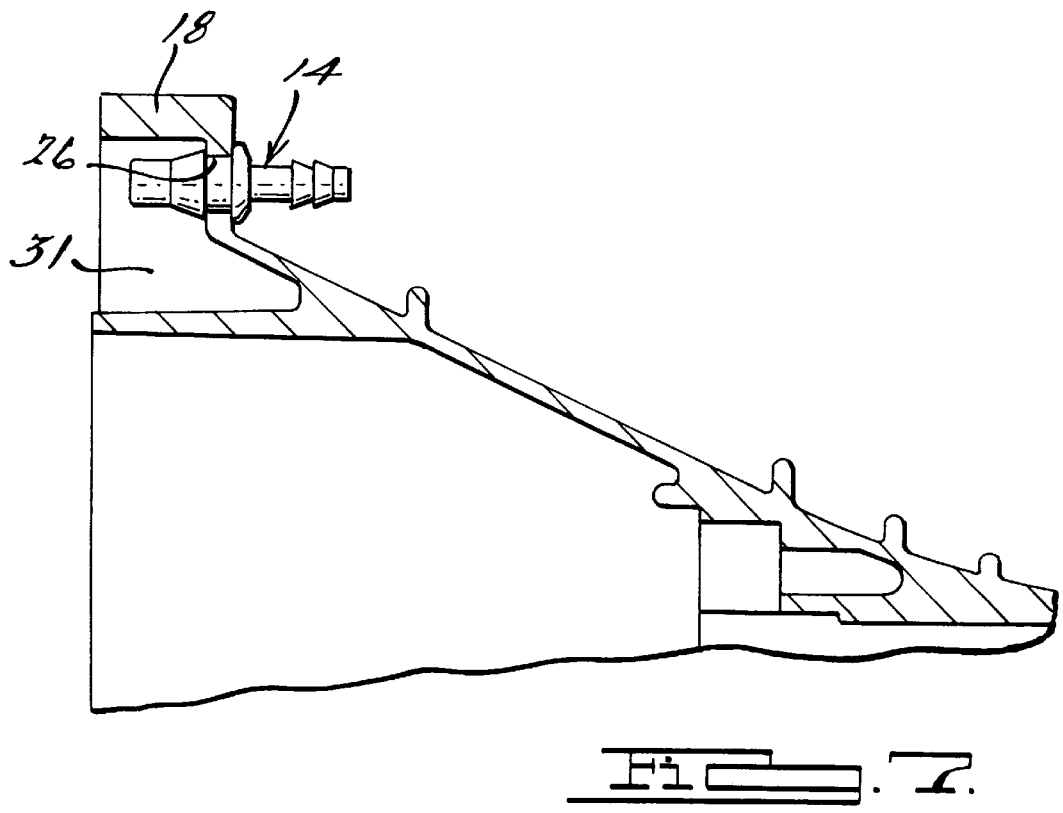
FIG. 7 is a sectional view taken along line 7—7 of FIG. 6.

The front body 16 includes an enlarged diameter end 30 extending axially from the middle barb 28 and into a sealed area 31 of the bell housing 18. As illustrated in FIGS. 6 and 7, the sealed area 31 is formed in the bell housing 18 by flanges 31b cast into the bell housing 18.

Flanges 31a are cast below a machined face of the flanges 31b to form a pocket which is divorced from the central area of the bell housing 18. The sealed area 31 communicates with atmosphere through an aperture 31c extending through the bell housing 18. It should be appreciated that the sealed area 31 is protected from water that may enter the bell housing 18 when the automotive vehicle traverses water.

The end 30 includes at least one, preferably a plurality of flanges 32 extending axially and outwardly and form a shoulder 33 to abut or engage an inner surface 34 of the bell housing 18. The flanges 32 are Christmas tree shaped and spaced circumferentially about the end 30. The flanges 32 flex to allow insertion through the aperture 26 in the bell housing 18. The front body 16 includes an enlarged cavity 36 extending axially into the end 30. The cavity 36 has a diameter greater than a diameter of the passage 20. The front body 16 is made of a semi-rigid material such as a plastic material and formed as one-piece. It should be appreciated that the front body 16 is secured to the bell housing 18 by the shoulder 24 and the flanges 32 to prevent axial movement thereof.

The vent system 10 also includes a connecting tube 38. The connecting tube 38 is a hollow tubular member having a first end 40, a second end 42 spaced axially from the first end and a central passage 44 extending between the first end 40 and the second end 42. The central passage 44 has a diameter which is less than a diameter of the barbs 22 of the front body 16. The first end 40 is connected to the front body 16 by pressing the connecting tube 38 over the barbs 22 which prevent the connecting tube 38 from disengaging the front body 16. The connecting tube 38 is made of a flexible material such as Epichlorohydrin. The connecting tube 38 is resistant to both transmission fluid and has a 275 degree Fahrenheit temperature capability.

Figure 3:
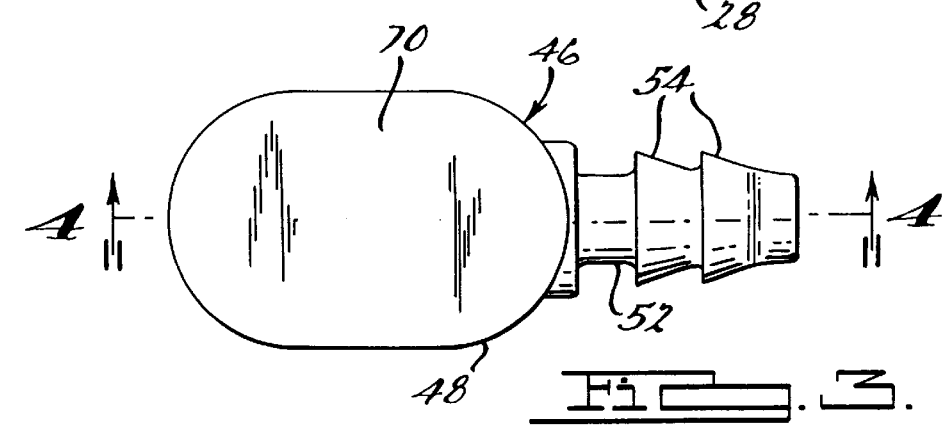
FIG. 3 is a plan view of a portion of the vent system of FIG. 1.

Referring to FIGS. 1 and 3 though 5, the vent system 10 further includes a rear body assembly, generally indicated at 46. The rear body assembly 46 includes a rear body 48 which is generally oval shaped and has a cavity 50 extending therein. The rear body 48 includes a connecting portion 52 extending axially and has a generally circular cross-section. The connecting portion 52 has at least one, preferably a plurality of barbs 54 extending radially outwardly. The barbs 54 are annular and Christmas tree shaped. The barbs 54 have a diameter greater than a diameter of the central passage 44 of the connecting tube 38. The second end 42 of the connecting tube 38 is pressed onto the connecting portion 52 over the barbs 54 and the barbs 54 prevent the connecting tube 38 from disengaging the rear body 48. The connection portion 52 also includes a passage 56 extending axially therethrough and communicating with the cavity 50.

The rear body 48 also includes a stem portion 58 extending generally perpendicular to the connecting portion 52. The stem portion 58 has a generally circular crosssection. The stem portion 58 has at least one, preferably a plurality of sealing rings 60 spaced axially and extending radially. The sealing rings 60 are annular in shape. The stem portion 50 includes at least one cut-out 62 to allow flexing for insertion into a bore of a transmission case or housing 63 of the automatic transmission 12. The stem portion 58 also includes a passage 64 extending axially therethrough and communicating with the cavity 50. The passage 64 is generally inclined axially from a larger diameter end to a smaller diameter end which communicates with the cavity 50. The cavity 50 has funnel-shaped portion 66 communicating with the passage 64 to drain back transmission fluid from the rear body 48 into the transmission housing 63. The rear body 48 is made of a semi-rigid material such as a plastic material and formed as one-piece. It should be appreciated that the sealing rings 60 are molded to the stem portion 58 and facilitate sealing without the use of a separate seal.

The rear body assembly 46 also includes a screen assembly or filter 68 disposed in the cavity 50 of the rear body 48. The filter 68 is generally oval in shape. The filter 68 is made of a porous material such as polyester material with a plurality of apertures extending therethrough for the separation of transmission fluid particle from air expelled from the automatic transmission 12. The filter 68 has a baffle (not shown) incorporated therein to redirect air to pass through the sides of the filter 68. The rear body assembly 46 also includes a cap 70 to close the cavity 50. The cap 70 is generally planar and oval shaped. The cap 70 includes a flange 72 extending outwardly and having a shape to fit into an enlarged or open end of the cavity 50. The cap 70 is made of plastic material.

In operation, the front body assembly 14 is plugged into the bell housing 18. The rear body assembly 46 is plugged into the transmission housing 63. The first end 40 of the connecting tube 38 is connected to the front body assembly 14 and the second end 42 is connected to the rear body assembly 46. If some transmission fluid passes the filter 68, the connecting tube 38 may act as a fluid reservoir. The connecting tube 38 is installed such that transmission fluid from the automatic transmission 12 must rise up the connecting tube 38, facilitating drainback of any fluid escaping past the rear body assembly 46. The placement of the front body assembly 14 in the bell housing 18 prevents the ingress of any water/moisture into the automatic transmission 12. The rear body assembly 46 separates transmission fluid particles from the air expelled from the inside of the automatic transmission and purges the separated transmission fluid into the transmission housing 63.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vent system for an automatic transmission comprising:
   a front body assembly connected to a housing of the automatic transmission;
   a connecting tube having a first end and a second end, said first end being connected to said front body assembly; and
   a rear body assembly connected to the housing and to said second end of said connecting tube, whereby the vent system allows ingress and egress of air between inside and outside of the automatic transmission and prevents ingress of moisture/water and egress of transmission fluid.

2. A vent system as set forth in claim 1 wherein said front body assembly comprises a front body extending axially and having a passage extending axially therethrough.

3. A vent system as set forth in claim 2 wherein said front body has a plurality of barbs for attachment to said connecting tube.

4. A vent system as set forth in claim 1 wherein said front body has a shoulder extending radially and adapted to abut an outer surface of the housing of the automatic transmission.

5. A vent system as set forth in claim 4 wherein said front body has a rear portion extending axially and a flange extending outwardly to abut an inner surface of the housing.

6. A vent system as set forth in claim 1 wherein said rear body assembly comprises a rear body having a cavity and a connecting portion extending outwardly and a stem portion extending generally perpendicular to said connecting portion.

7. A vent system a set forth in claim 6 wherein said connecting portion has a plurality of barbs extending outwardly.

8. A vent system as set forth in claim 6 wherein said stem portion has a plurality of sealing rings extending outwardly and spaced axially.

9. A vent system as set forth in claim 6 wherein said stem portion has a passage extending therethrough and communicating with said cavity.

10. A vent system as set forth in claim 6 wherein said connecting portion has a passage extending therethrough and communicating with said cavity.

11. A vent system as set forth in claim 6 wherein said rear body assembly includes a filter disposed in said cavity.

12. A vent system for an automatic transmission comprising:

a front body assembly connected to a housing of the automatic transmission;

a connecting tube having a first end and a second end, said first end being connected to said front body assembly; and a rear body assembly connected to the housing and said second end of said connecting tube and including a rear body having a cavity and a filter disposed in said cavity to separate transmission fluid from air expelled from inside the automatic transmission.

13. A vent system as set forth in claim 12 wherein said rear body comprises a connecting portion extending outwardly and a stem portion extending generally perpendicular to said connecting portion.

14. A vent system a set forth in claim 13 wherein said connecting portion has a plurality of barbs extending outwardly.

15. A vent system as set forth in claim 13 wherein said stem portion has a plurality of sealing rings extending outwardly and spaced axially.

16. A vent system as set forth in claim 13 wherein said stem portion has a passage extending therethrough and communicating with said cavity.

17. A vent system as set forth in claim 13 wherein said connecting portion has a passage extending therethrough and communicating with said cavity.

18. A vent system as set forth in claim 12 wherein said front body has a shoulder extending radially and adapted to abut an outer surface of the housing of the automatic transmission.

19. A vent system as set forth in claim 12 wherein said front body has a rear portion extending axially and a flange extending outwardly to abut an inner surface of the housing.

20. A vent system for an automatic transmission comprising:

a front body assembly connected to a housing of the automatic transmission;

a connecting tube having a first end and a second end, said first end being connected to said front body assembly; and a rear body assembly connected to the housing and said second end of said connecting tube and including a rear body having a cavity, a connecting portion extending outwardly from said rear body and connected to said second end, a stem portion extending generally perpendicular to said connecting portion for insertion into the housing, and a filter disposed in said cavity to separate transmission fluid from air expelled from inside the automatic transmission.

* * * * *